United States Patent
Du

(10) Patent No.: US 12,485,895 B2
(45) Date of Patent: Dec. 2, 2025

(54) DATA PROCESSING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventor: Haining Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/528,202

(22) Filed: Dec. 4, 2023

(65) Prior Publication Data

US 2024/0182031 A1 Jun. 6, 2024

Related U.S. Application Data

(63) Continuation of application No. PCT/CN2023/070887, filed on Jan. 6, 2023.

(30) Foreign Application Priority Data

Jan. 6, 2022 (CN) .......................... 202210011355.5

(51) Int. Cl.
*B60W 30/16* (2020.01)
*B60W 30/18* (2012.01)
(Continued)

(52) U.S. Cl.
CPC ...... *B60W 30/16* (2013.01); *B60W 30/18163* (2013.01); *B60W 50/14* (2013.01);
(Continued)

(58) Field of Classification Search
None
See application file for complete search history.

(56) References Cited

U.S. PATENT DOCUMENTS 5,892,855 A * 4/1999 Kakinami ............ G06V 10/48
382/104
9,886,858 B2 * 2/2018 Murray .................... G08G 1/04
(Continued)

FOREIGN PATENT DOCUMENTS

CN 111717198 A 9/2020
CN 111739342 A 10/2020
(Continued)

OTHER PUBLICATIONS

The World Intellectual Property Organization (WIPO) International Search Report for PCT/CN2023/070887 Apr. 3, 2023 9 Pages (including translation).

(Continued)

*Primary Examiner* — Kevin R Steckbauer
(74) *Attorney, Agent, or Firm* — ANOVA LAW GROUP, PLLC

(57) ABSTRACT

A data processing method includes: determining, based on a position of a first vehicle around a target vehicle, multiple areas around the first vehicle, a longitudinal center line of the first vehicle not coinciding with a center line of a first lane in which the first vehicle travels; determining, based on a relative position between the target vehicle and the first vehicle, a target area in which the target vehicle is located in the multiple areas; and providing a prompt based on the target area.

18 Claims, 4 Drawing Sheets

(51) Int. Cl.
*B60W 50/14* (2020.01)
*G08G 1/16* (2006.01)

(52) U.S. Cl.
CPC ....... *G08G 1/167* (2013.01); *B60W 2050/146* (2013.01); *B60W 2554/802* (2020.02)

(56) References Cited

U.S. PATENT DOCUMENTS

| | | | | |
|---|---|---|---|---|
| 10,185,322 | B1* | 1/2019 | Desjarlais | G05D 1/0212 |
| 10,449,960 | B2* | 10/2019 | Keller | G06F 18/254 |
| 11,021,155 | B2* | 6/2021 | Tokimasa | G06T 7/70 |
| 11,046,310 | B2* | 6/2021 | Yoo | B60W 30/16 |
| 11,180,142 | B2* | 11/2021 | Ide | G01S 13/931 |
| 11,414,083 | B2* | 8/2022 | Berghöfer | G08G 1/167 |
| 11,440,563 | B2* | 9/2022 | Kumano | G06V 20/58 |
| 11,702,079 | B2* | 7/2023 | Yasui | B60W 30/18163 701/96 |
| 11,708,069 | B2* | 7/2023 | Tominaga | B60W 30/0953 701/41 |
| 11,807,261 | B2* | 11/2023 | Zhang | B60W 50/14 |
| 11,973,922 | B2* | 4/2024 | Kakimaru | B60K 35/22 |
| 12,112,554 | B2* | 10/2024 | Lilja | G06V 20/588 |
| 12,122,383 | B2* | 10/2024 | Qian | B60W 30/16 |
| 12,330,652 | B2* | 6/2025 | Martin | B60W 30/12 |
| 2017/0057510 | A1* | 3/2017 | Herbach | B60W 30/181 |
| 2017/0120912 | A1* | 5/2017 | Ishioka | B60W 30/16 |
| 2017/0259819 | A1* | 9/2017 | Takeda | B60W 30/18163 |
| 2017/0309182 | A1* | 10/2017 | Murray | G08G 1/0112 |
| 2018/0043890 | A1* | 2/2018 | Keller | B60W 30/08 |
| 2018/0079409 | A1* | 3/2018 | Nath | G08G 1/167 |
| 2018/0148061 | A1* | 5/2018 | Reckziegel | B60W 50/14 |
| 2018/0170388 | A1* | 6/2018 | Shin | B60W 60/001 |
| 2018/0201271 | A1* | 7/2018 | Ishioka | B60W 10/04 |
| 2019/0004529 | A1* | 1/2019 | Im | G08G 1/167 |
| 2019/0025836 | A1* | 1/2019 | Desjarlais | G05D 1/0214 |
| 2019/0077404 | A1* | 3/2019 | Takeda | B60W 30/0956 |
| 2019/0092330 | A1* | 3/2019 | Ide | G01S 13/66 |
| 2019/0193739 | A1* | 6/2019 | Tokimasa | G06V 20/588 |
| 2019/0225216 | A1* | 7/2019 | Yasui | B60W 50/0097 |
| 2019/0263401 | A1* | 8/2019 | Yoo | B60W 10/04 |
| 2019/0279507 | A1* | 9/2019 | Ishisaka | B60W 50/0097 |
| 2019/0359218 | A1* | 11/2019 | Pohl | B60W 30/0956 |
| 2020/0290618 | A1* | 9/2020 | Conrad | B60W 30/162 |
| 2020/0317199 | A1* | 10/2020 | Berghöfer | B60W 60/0016 |
| 2020/0406920 | A1* | 12/2020 | Kumano | G01C 21/3407 |
| 2021/0262808 | A1* | 8/2021 | Wang | G01C 21/32 |
| 2021/0300374 | A1* | 9/2021 | Yasui | B60W 30/16 |
| 2021/0319700 | A1* | 10/2021 | Kang | G08G 1/166 |
| 2022/0144278 | A1* | 5/2022 | Hiramatsu | B60W 30/18054 |
| 2023/0012853 | A1* | 1/2023 | Tam | B60W 30/0953 |
| 2023/0037367 | A1* | 2/2023 | Qian | B60W 30/18163 |
| 2023/0041319 | A1* | 2/2023 | You | G08G 1/096791 |
| 2023/0202471 | A1* | 6/2023 | Yu | B60W 30/0956 701/26 |
| 2023/0278563 | A1* | 9/2023 | Xiao | B60W 30/18163 701/1 |
| 2024/0051540 | A1* | 2/2024 | Aotani | B60W 30/18163 |
| 2024/0135822 | A1* | 4/2024 | Hashimoto | B60W 40/04 |
| 2024/0140423 | A1* | 5/2024 | Kobayashi | B60W 30/165 |
| 2024/0182031 | A1* | 6/2024 | Du | B60W 30/18163 |
| 2024/0190437 | A1* | 6/2024 | Kitaoka | B60W 30/162 |
| 2025/0065889 | A1* | 2/2025 | Horn | G06V 20/588 |
| 2025/0074408 | A1* | 3/2025 | Katayama | B60W 30/0956 |
| 2025/0074460 | A1* | 3/2025 | Song | B60W 60/001 |
| 2025/0153710 | A1* | 5/2025 | Takahashi | B60W 30/18163 |

FOREIGN PATENT DOCUMENTS

| | | | | |
|---|---|---|---|---|
| CN | 112416004 | A * | 2/2021 | ........ B60W 60/001 |
| CN | 113158349 | A * | 7/2021 | ........... G06F 30/20 |
| CN | 113793533 | A * | 12/2021 | ........... G08G 1/166 |
| CN | 114348001 | A * | 4/2022 | .......... B60W 50/14 |
| CN | 115123303 | A * | 9/2022 | ....... B60W 60/0011 |
| CN | 115158319 | A * | 10/2022 | .......... B60W 50/00 |
| CN | 114348001 | B * | 4/2024 | .......... B60W 50/14 |
| CN | 117842004 | A * | 4/2024 | ............ B60Q 1/535 |
| CN | 115123303 | B * | 2/2025 | .......... B60W 30/14 |
| CN | 119540912 | A * | 2/2025 | .......... B60W 40/06 |
| EP | 4458633 | A1 * | 11/2024 | ........... G08G 1/167 |
| JP | 2019121040 | A | 7/2019 | |
| WO | WO-2017199965 | A1 * | 11/2017 | ............... B60T 7/12 |
| WO | WO-2020221420 | A1 * | 11/2020 | ............ G05D 1/695 |
| WO | 2021057134 | A1 | 4/2021 | |
| WO | WO-2023015505 | A1 * | 2/2023 | ...... B60W 30/18163 |

OTHER PUBLICATIONS

The State Intellectual Property Office of the People's Republic of China (SIPO) Office Action 1 for 202210011355.5 Nov. 8, 2023 9 Pages (including translation).
The World Intellectual Property Organization (WIPO) International Search Report for PCT/CN2023/070887 Apr. 3, 2023 14 Pages (including translation).

* cited by examiner

DATA PROCESSING METHOD, APPARATUS, AND DEVICE, AND STORAGE MEDIUM

RELATED APPLICATION

This application is a continuation application of PCT Patent Application No. PCT/CN2023/070887, filed on Jan. 6, 2023, which claims priority to Chinese Patent Application No. 2022100113555, filed on Jan. 6, 2022, all of which is incorporated herein by reference in their entirety.

FIELD OF THE TECHNOLOGY

Embodiments of the present disclosure relate to the fields of intelligent transportation and autonomous driving technologies and, in particular, relate to a data processing method, apparatus, and device, and a storage medium.

BACKGROUND OF THE DISCLOSURE

When it comes to road safety, higher standards are increasingly required for intelligent control system of vehicles. Usually, a driving route is changed directly according to an operation of a driver. In most cases, traffic congestion information of a road ahead is the only information that can be provided to the driver. Currently, it is difficult to provide the driver with more road information instantly and also difficult to provide the driver with prompt information while the driver is in driving process.

SUMMARY

One aspect of the present disclosure provides a data processing method. The method includes determining, based on a position of a first vehicle around a target vehicle, multiple areas around the first vehicle, a longitudinal center line of the first vehicle not coinciding with a center line of a first lane in which the first vehicle travels; determining, based on a relative position between the target vehicle and the first vehicle, a target area, in the multiple areas, in which the target vehicle is located; and providing a prompt based on the target area.

Another aspect of the present disclosure provides an electronic device. The electronic device includes one or more processors; a memory coupled to the one or more processors and storing a computer program that, when being executed, causes the one or more processors to perform: determining, based on a position of a first vehicle around a target vehicle, multiple areas around the first vehicle, a longitudinal center line of the first vehicle not coinciding with a center line of a first lane in which the first vehicle travels; determining, based on a relative position between the target vehicle and the first vehicle, a target area, in the multiple areas, in which the target vehicle is located; and providing a prompt based on the target area.

Another aspect of the present disclosure provides a non-transitory computer readable storage medium, configured to store a computer program that causes a computer to perform: determining, based on a position of a first vehicle around a target vehicle, multiple areas around the first vehicle, a longitudinal center line of the first vehicle not coinciding with a center line of a first lane in which the first vehicle travels; determining, based on a relative position between the target vehicle and the first vehicle, a target area, in the multiple areas, in which the target vehicle is located; and providing a prompt based on the target area.

As disclosed, based on a position of a first vehicle around a target vehicle, multiple areas around the first vehicle are determined, a longitudinal center line of the first vehicle not coinciding with a center line of a first lane in which the first vehicle travels; based on a relative position between the target vehicle and the first vehicle, a target area, in which the target vehicle is located, is determined in the multiple areas; and based on the target area, prompt information is displayed. This solution may provide more information for a driver with reference to a current driving environment, thereby improving user experience and driving safety.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DESCRIPTION OF EMBODIMENTS

Figure 1:
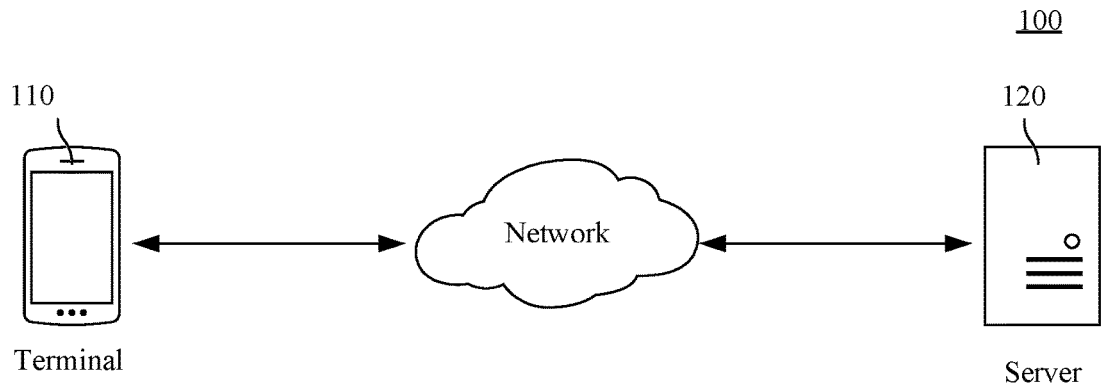
FIG. 1 is a schematic block diagram of a system framework according to an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

The present disclosure provides a data processing method, apparatus, and device, and a storage medium, which can provide more information for a driver with reference to a current driving environment, thereby improving user experience and driving safety.

The solutions provided in the present disclosure may be applied to multiple vehicle control scenarios. For example, the solutions provided in the present disclosure may relate to an artificial intelligence (AI) technology. AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

It is to be understood that the AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

With research and progress of artificial intelligence technologies, the artificial intelligence technologies are studied and applied in multiple fields, such as common smart home, intelligent wearable devices, virtual assistants, intelligent sound boxes, intelligent marketing, unmanned driving, autonomous driving, unmanned aerial vehicles, robots, intelligent medical treatment, and intelligent customer service. It is believed that with development of technologies, artificial intelligence technologies will be applied in more fields and play an increasingly important role.

The solutions provided in the present disclosure may be applied to technologies such as an autonomous driving technology or an auxiliary driving technology of artificial intelligence. For example, the data processing method in the present disclosure may be applied to the autonomous driving technology.

Based on this, according to the method provided in the present disclosure, corresponding prompt information may be displayed in real time according to a traffic status in a scenario, so that a driver or an autonomous driving control center confirms a traveling track of a vehicle in real time, thereby reducing a probability of a traffic accident of the vehicle, thereby improving safety. The autonomous driving technology may include technologies such as a high-precision map, environment awareness, behavior decision, path planning, and motion control. The autonomous driving technology has a wide application prospect. For another example, the data processing method in the present disclosure may be applied to the auxiliary driving technology. As such, the method provided in the present disclosure may be used for assisting a driver in driving a vehicle, with reduced probability on traffic accident, thereby improving safety.

In addition, the solutions provided in the present disclosure may further relate to various network frameworks, such as the Internet of Things (IOT) or cloud IoT related to the transportation industry. The Internet of Things in the transportation industry may also be referred to as vehicle-to-everything.

The Internet of Things means that by using various apparatuses and technologies such as information sensors, radio frequency recognition technologies, global positioning systems, infrared sensors, and laser scanners, any object or process that needs to be monitored, connected, or interacted with is collected in real time, and various required information such as sound, light, heat, electricity, mechanics, chemistry, biology, and position is collected, to implement universal connections between objects and between objects and people by using various possible network access, and to intelligently perceive, recognize, and manage the objects and the processes. Internet of Things is an information carrier according to the Internet, traditional telecommunication network, etc. It enables all ordinary physical objects that can be independently addressed to form an interconnected network.

The cloud Internet of Things is designed to access, to the Internet, information sensed by a sensing device and an instruction received by the sensor device in traditional Internet of Things, truly implement networking, and implement massive data storage and computing by using a cloud computing technology. Because a feature of the Internet of Things is that things are connected to things, and a current running status of each "object" is perceived in real time, a large amount of data information is generated in this process. How to summarize the information, and how to select useful information from the massive information to make decision support for subsequent development have become key problems that affect the development of the Internet of Things, and therefore, the cloud of the Internet of Things based on the cloud computing and the cloud storage technology becomes powerful support for the Internet of Things technology and the application.

FIG. 1 is a schematic block diagram of a system framework 100 according to an embodiment of the present disclosure. As shown in FIG. 1, the system framework 100 includes a terminal device 110 and a server 120. The terminal device 110 may communicate with the server 120 based on the Internet protocol in a wireless or wired manner. A quantity of terminal devices 110 and a quantity of servers 120 in FIG. 1 are merely an example. According to an implementation requirement, there may be any quantity of terminal devices 110 and any quantity of servers 120.

The terminal device 110 includes but is not limited to an intelligent mobile phone, a tablet computer, an in-vehicle terminal, a palm game console, and another small personal portable device, such as a personal digital assistant (PDA) or an electronic book (E-book). The server 120 may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, big data, and an artificial intelligence platform. The server may be directly or indirectly connected in a wired or wireless communication manner, which is not limited herein.

The terminal device 110 may be located in a current vehicle, and obtains positioning information of a first vehicle from the server; and positioning information of another vehicle around the current vehicle, so that the terminal device 110 determines, based on a position of a first vehicle around a target vehicle, multiple areas around the first vehicle, a longitudinal center line of the first vehicle not coinciding with a center line of a first lane in which the first vehicle travels; determines, based on a relative position between the target vehicle and the first vehicle, a target area in which the target vehicle is located in the multiple areas; and provides a corresponding prompt based on the target area.

In one embodiment, the terminal device 110 may further store a traffic network parameter of a target road section and traveling data of a vehicle on the target road section. The traffic network parameter of the target road section may include parameters such as a quantity of roads of a real target road section, relative angle information between roads, and a pedestrian of the target road section, and may further include parameters such as a traffic light identifier and a speed limit identifier that are set in the target road section. The traveling data of the vehicle on the target road section may include a traveling speed interval, a steering angle, a lateral distance and a longitudinal distance between vehicles on the real target road section, and the like. In one embodiment, the traffic network parameter of the target road section and the traveling data of the vehicle on the target road section may further be obtained from the server. The server may also obtain the traffic network parameter of the target road section and the traveling data of the vehicle on the target road section from another road monitoring server, which is not specifically limited in the present disclosure.

The present disclosure provides a solution applied, when a longitudinal center line of a vehicle body does not coincide with a center line of a lane.

Figure 2:
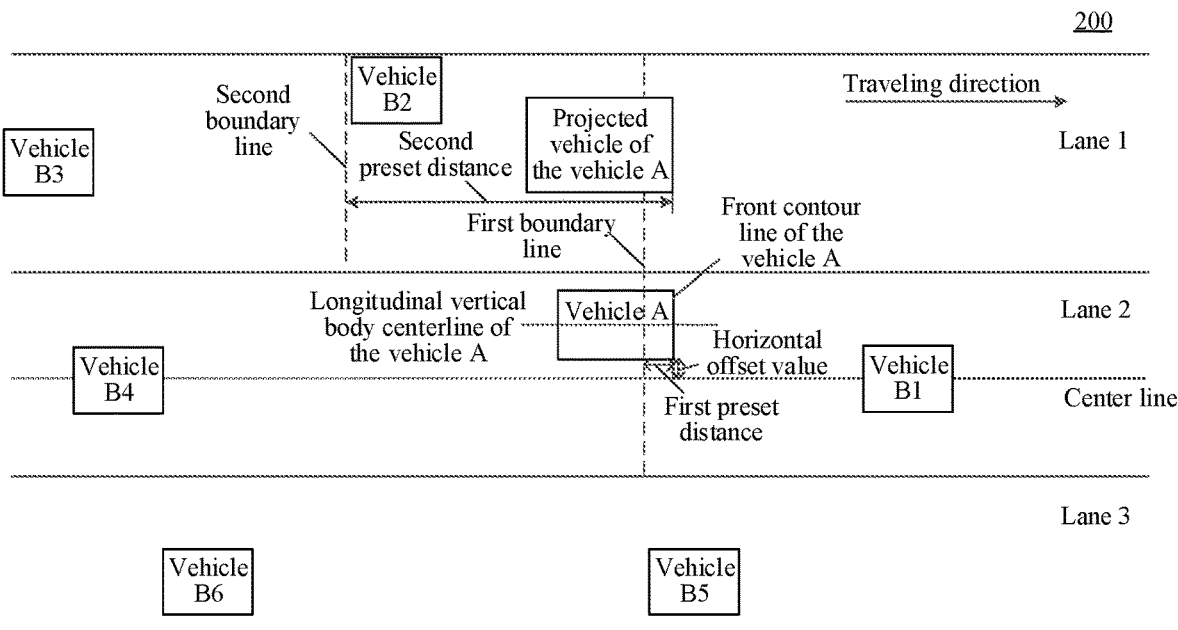
FIG. 2 is an example of a scenario of a data processing method according to an embodiment of the present disclosure.

FIG. 2 is an example of a scenario 200 where a data processing method is applied according to an embodiment of the present disclosure. The data processing method is applicable to a current vehicle in traveling, that is, a target vehicle, and is further applicable to a terminal device disposed in the current vehicle, and is further applicable to a server.

As shown in FIG. 2, the scenario 200 includes a lane 1, a lane 2, a lane 3, a vehicle A, a vehicle B1, a vehicle B2, a vehicle B3, a vehicle B4, a vehicle B5, and a vehicle B6. A vehicle traveling direction on the lane 1, the lane 2, and the lane 3 is the same. A specific traveling direction is shown by a traveling direction arrow in FIG. 2. A vehicle body longitudinal center line of the vehicle A does not coincide with a center line of the lane 2. The vehicle B1, the vehicle B2, the vehicle B3, the vehicle B4, the vehicle B5, and the vehicle B6 are all peripheral vehicles of the vehicle A. In one embodiment, the current vehicle may be any vehicle in the vehicle B1, the vehicle B2, the vehicle B3, the vehicle B4, the vehicle B5, and the vehicle B6, and a first vehicle may be the vehicle A.

The present disclosure provides a solution, when the vehicle body longitudinal center line of the vehicle A does not coincide with the center line of the lane 2.

Figure 3:
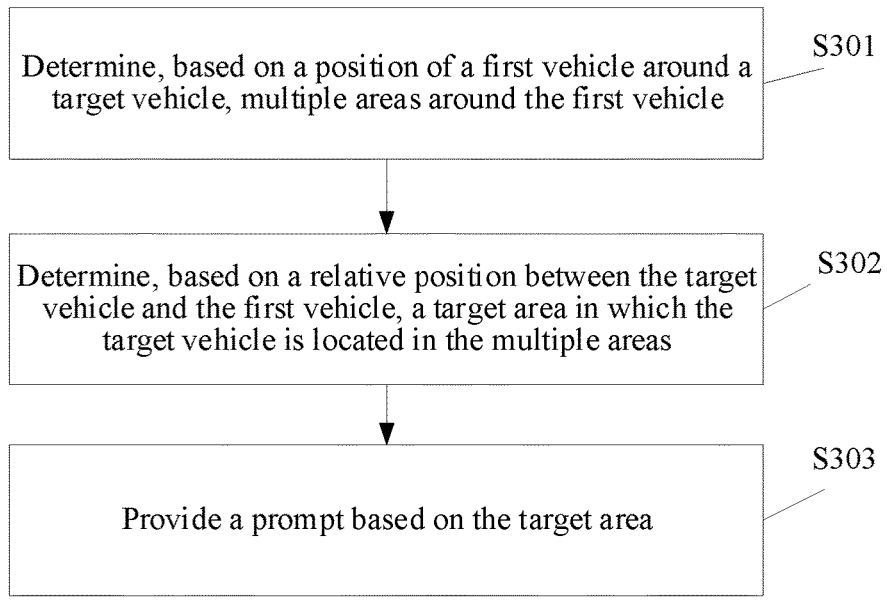
FIG. 3 is a schematic flowchart of a data processing method according to an embodiment of the present disclosure.

FIG. 3 is a schematic flowchart of a data processing method 300 according to an embodiment of the present disclosure. The method may be applied to a server of an integrated data processing system. The server may be the server 120 shown in FIG. 1, and is further applicable to a current vehicle in traveling, that is, a target vehicle, and is further applicable to a terminal device disposed in the current vehicle.

As shown in FIG. 3, the method 300 may include some or all of the following content:

S301. Determine, based on a position of a first vehicle around a target vehicle, multiple areas around the first vehicle, a longitudinal center line of the first vehicle not coinciding with a center line of a first lane in which the first vehicle travels.

S302. Determine, based on a relative position between the target vehicle and the first vehicle, a target area in which the target vehicle is located in the multiple areas.

S303. Provide a prompt accordingly, based on the target area.

In one embodiment, the first vehicle may be a vehicle calibrated by a user, such as a driver, or may be a vehicle determined according to surrounding driving environment information, where the driving environment information may be received from the server or a roadside device.

In one embodiment, that the longitudinal center line of the first vehicle does not coincide with the center line of the first lane in which the first vehicle travels in the present disclosure may mean that the longitudinal center line of the first vehicle and the center line of the first lane in which the first vehicle travels are parallel in a Frenet coordinate system; or may mean that the longitudinal center line of the first vehicle and the center line of the first lane in which the first vehicle travels are at any angle, provided that the longitudinal center line of the first vehicle does not coincide with the center line of the first lane in which the first vehicle travels. The present disclosure sets no specific limitation on an angle relationship between the longitudinal center line of the first vehicle and the center line of the first lane.

Figure 4:
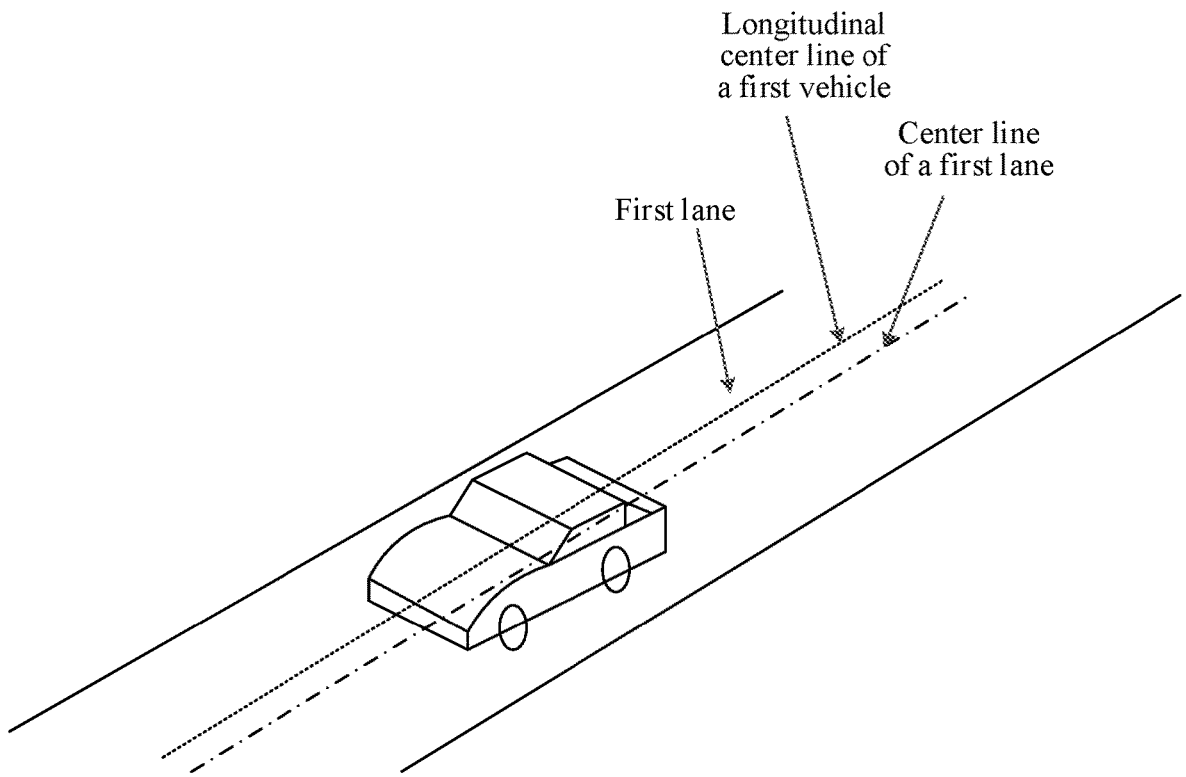
FIG. 4 is an example of a vehicle offset scenario in a data processing method according to an embodiment of the present disclosure.

For example, as shown in FIG. 4, the longitudinal center line of the first vehicle and the center line of the first lane may be parallel in the Frenet coordinate system. Certainly, they may also be at any angle, provided that the longitudinal center line of the first vehicle does not coincide with the center line of the first lane in which the first vehicle travels. The present disclosure sets no specific limitation on an angle relationship between the longitudinal center line of the first vehicle and the center line of the first lane.

For example, the first vehicle is in the first lane and does not cross the first lane. Certainly, in another alternative embodiment, the first vehicle may also travel on a lane boundary line in the first lane.

For example, with reference to FIG. 2, as shown in FIG. 2, if the vehicle A is the first vehicle, and the vehicle A does not travel along the center line of the lane 2, there is a lateral offset $D_{offset}$ (according to the Frenet coordinate system) between the vehicle body longitudinal center line of the vehicle A and the center line of the lane 2, and an outer contour of the vehicle A does not cross the lane boundary line. It is to be understood that $D_{offset}$ is between 0 and H/2 (H is a width of the lane 2).

In an embodiment, the target area in which the target vehicle is located may be determined according to positioning information of the target vehicle. The positioning information of the target vehicle may be positioning information of a geometric center or a centroid of a rectangular outer contour of the target vehicle. The positioning information only considers a position on a two-dimensional plane without considering an elevation.

Based on the foregoing technical solution, first, multiple areas around the first vehicle that is not traveling on the center line of the first lane are determined, which is equivalent to that a driving behavior of a vehicle in a range around the first vehicle is affected by the first vehicle. Second, the target area in which the target vehicle is located is determined in the multiple areas, and vehicles in different areas around the first vehicle are differently affected by the first vehicle. Finally, based on the target area, a corresponding prompt is provided, so that a driver or an autonomous driving control center can confirm a traveling track of the vehicle in real time, thereby reducing a probability that a traffic accident occurs on the vehicle, thereby improving safety. In addition, the driver can be provided with more information with reference to a current driving environment, thereby improving user experience and driving safety.

In one embodiment, providing a prompt may include: displaying corresponding prompt information.

In one embodiment, providing a prompt may include: generating corresponding prompt information; and sending the prompt information to a server, so that the server forwards the prompt information to an autonomous driving control center, so that a related person confirms a vehicle traveling track.

In some embodiments of the present disclosure, S301 may include:

determining, based on the position of the first vehicle, a boundary line that passes through the first vehicle, which is parallel to a normal direction of the first lane, and that is at a first preset distance from a front contour line of the first vehicle, as a first boundary line; and determining a front area that is located in a right adjacent lane of the first lane in which the first vehicle is currently traveling and that is of the first boundary line in a traveling direction of the first vehicle as a first area in the multiple areas.

For example, the first preset distance may be a distance calculated according to historical traffic data, or may be a distance obtained according to expert experience, or may be a longitudinal distance between the front contour line of the first vehicle and a center position of the driver seat of the first vehicle. A specific value of the first preset distance is not specifically limited in the present disclosure.

The front contour line of the first vehicle is a first side of an obtained outer contour rectangle after the first vehicle is mapped to a two-dimensional plane, and the first side is a side corresponding to a head contour of the first vehicle.

With reference to FIG. 2, as shown in FIG. 2, on one hand, because the vehicle A is offset in a direction of the lane 1, a vehicle on the lane 3 is not affected. On the other hand, because of a limited angle of view, a vehicle in the front area of the first boundary line in the traveling direction of the vehicle A cannot perceive that the vehicle A is not traveling on the center line of the first lane, and therefore, the vehicle in the front area also does not need to change the driving behavior.

Based on this, the first area is the front area of the first boundary line in the traveling direction and the lane 3.

In some embodiments of the present disclosure, S303 may include:

displaying, when the target area is the first area, prompt information notifying that the target vehicle is capable of being controlled to keep an original driving behavior.

In some embodiments of the present disclosure, S301 may include:

determining, based on the position of the first vehicle, a boundary line that passes through the first vehicle, which is parallel to a normal direction of the first lane, and that is at a first preset distance from a front contour line of the first vehicle, as a first boundary line;

determining, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and determining an area between the first boundary line and the second boundary line and located on a left adjacent lane in the traveling direction of the first vehicle as a second area in the multiple areas.

For a manner of determining the second preset distance, refer to the manner of determining the first preset distance in the first area. Details are not described herein again.

For example, the second preset distance may be a distance calculated according to historical traffic data, or may be a distance obtained according to expert experience.

With reference to FIG. 2, as shown in FIG. 2, the second area is an area between the first boundary line and the second boundary line on the lane 1.

Certainly, in another alternative implementation, the second boundary line may further be related to a size of the first vehicle. For example, a boundary line that is located in a direction opposite to the traveling direction of the first vehicle, which is parallel to the normal direction of the first lane, and that is at the second preset distance laterally from the driver seat center position of the first vehicle may be determined as the second boundary line.

In some embodiments of the present disclosure, S303 may include:

determining, when the target area is the second area and a first lane changing instruction used for instructing the target vehicle to change a lane is obtained, whether the target vehicle meets a safe lane changing condition, the safe lane changing condition representing that both a longitudinal distance between the target vehicle and a second vehicle on a first to-be-changed lane and a longitudinal distance between the target vehicle and a third vehicle on the first to-be-changed lane are greater than a third preset distance, the second vehicle being a vehicle before the target vehicle in the traveling direction of the target vehicle, and the third vehicle being a vehicle after the target vehicle in the traveling direction of the target vehicle;

displaying, when the target vehicle meets the safe lane changing condition, prompt information notifying that the target vehicle is capable of being controlled to change to the first to-be-changed lane; and displaying, when the target vehicle does not meet the safe lane changing condition, prompt information notifying that the target vehicle is incapable of being controlled to change to the first to-be-changed lane.

For example, the first to-be-changed lane is a right adjacent lane of the first lane in which the first vehicle currently travels. Certainly, the first to-be-changed lane may also be a left adjacent lane of a lane in which the target vehicle currently travels, that is, provided that the first to-be-changed lane is different from the first lane and the first to-be-changed lane is a changeable lane specified in a traffic rule. The present disclosure specifically sets no specific limitation on the first to-be-changed lane. It is to be understood that the first to-be-changed lane is not only related to the position of the target vehicle, but also related to a total quantity of lanes.

For example, the third preset distance may be a preset distance obtained according to experience, or may be a preset distance obtained according to a current speed of the target vehicle. For example, if the current vehicle speed of the target vehicle is 100 km/h, the third preset distance may be 100 meters. If the current vehicle speed of the target vehicle is 60 km/h, the third preset distance may be 80 meters. A specific value of the third preset distance is not specifically limited in the present disclosure.

With reference to FIG. 2, as shown in FIG. 2, if the vehicle A is the first vehicle and the vehicle B2 is the target vehicle, the vehicle B2 is located in the second area between the first boundary line and the second boundary line on the lane 1. When the first lane changing instruction used for instructing the B2 to change a lane is obtained, it indicates that the vehicle B2 has a lane changing intention, and then it is determined whether the vehicle B2 meets a lane changing condition, that is, it is determined whether a longitudinal distance between the vehicle B2 and the vehicle B5 of the first to-be-changed lane (lane 3), and whether a longitudinal distance between the vehicle B2 and the vehicle B6 of the first to-be-changed lane (lane 3) is greater than the third preset distance. If both are greater than the third preset distance, prompt information notifying that the vehicle B2 is capable of being controlled to change to the first to-be-changed lane (lane 3) is displayed.

In some embodiments of the present disclosure, S303 may further include:

determining, when the target area is the second area and an acceleration instruction used for instructing the target vehicle to accelerate is obtained, whether the target vehicle meets a safe acceleration condition, the safe acceleration condition representing that after the target vehicle accelerates at a first acceleration for first duration, a distance between a vehicle before the target vehicle and the target vehicle is greater than 0;

displaying, when the target vehicle meets the safe acceleration condition, prompt information notifying that the target vehicle is capable of being controlled to perform an acceleration operation; and displaying, when the target vehicle does not meet the safe acceleration condition, prompt information notifying that the target vehicle is incapable of being controlled to perform an acceleration operation.

In some embodiments of the present disclosure, it is determined, when the target vehicle meets the safe acceleration condition, whether the target vehicle is to travel out of the second area after traveling for the first duration; and it is redetermined, when the target vehicle does not travel out of the second area, whether the target vehicle meets the safe acceleration condition.

In an implementation, it is prompted, when the target vehicle has traveled out of the second area after the target vehicle accelerates at a first acceleration for first duration, that the target vehicle is capable of being controlled to follow a vehicle ahead in a traveling lane of the target vehicle.

When an acceleration instruction used for instructing the target vehicle to accelerate is obtained, it is determined that the target vehicle has an acceleration intention. In the present disclosure, specific values of the first acceleration and the first duration are not specifically limited, provided that an average speed of the target vehicle does not exceed a maximum speed limit of a traveling road, and after the target vehicle accelerates at the first acceleration for the first duration, a distance between a vehicle before the target vehicle and the target vehicle is greater than 0.

In some embodiments of the present disclosure, S303 may further include:

prompting, when the target area is the second area and an offset instruction used for instructing the target vehicle to perform left-side offset on the current lane is obtained, that the target vehicle is capable of being controlled to offset to the left side of the current lane in which the target vehicle is traveling, and continue to travel until travel out of the second area.

When an offset instruction used for instructing the target vehicle to perform left-side offset on the current lane is obtained, it is determined that the target vehicle has an offset intention. The present disclosure sets no specific limitation on an offset angle of the target vehicle, provided that a left outer contour line of the target vehicle in the current traveling direction of the target vehicle does not exceed the current traveling lane of the target vehicle.

In some embodiments of the present disclosure, S301 may include:

determining, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and determining a rear area that is on a left adjacent lane of the first lane in which the first vehicle is currently traveling and that is of the second boundary line in the traveling direction of the first vehicle as a third area in the multiple areas.

For a manner of determining the second boundary line and the second preset distance, refer to the manner of determining the second boundary line in the second area and the second preset distance. Details are not described herein again.

With reference to FIG. 2, as shown in FIG. 2, the rear area on the lane 1 and of the second boundary line in the traveling direction of the vehicle A is determined as the third area, that is, an area in which the vehicle B3 is located.

In some embodiments of the present disclosure, S303 may include:

determining, when the target area is the third area and a second lane changing instruction used for instructing the target vehicle to change a lane is obtained, whether the target vehicle meets a safe lane changing condition, the safe lane changing condition representing that both a longitudinal distance between the target vehicle and a fourth vehicle on a second to-be-changed lane and a longitudinal distance between the target vehicle and a fifth vehicle on the second to-be-changed lane are greater than a fourth preset distance, the fourth vehicle being a vehicle before the target vehicle in the traveling direction of the target vehicle, and the fifth vehicle being a vehicle after the target vehicle in the traveling direction of the target vehicle;

displaying, when the target vehicle meets the safe lane changing condition, prompt information notifying that the target vehicle is capable of being controlled to change to the second to-be-changed lane; and displaying, when the target vehicle does not meet the safe lane changing condition, prompt information notifying that the target vehicle is incapable of being controlled to change to the second to-be-changed lane.

For example, the second to-be-changed lane is a right adjacent lane of the first lane in which the first vehicle currently travels. Certainly, the second to-be-changed lane may also be a left adjacent lane of a lane in which the target vehicle currently travels, that is, provided that the second to-be-changed lane is different from the first lane and the second to-be-changed lane is a changeable lane specified in a traffic rule. The present disclosure specifically sets no specific limitation on the second to-be-changed lane. It is to be understood that the second to-be-changed lane is not only related to the position of the target vehicle, but also related to a total quantity of lanes.

For example, the fourth preset distance may be a preset fixed distance, or may be a preset distance calculated according to the current speed of the target vehicle. For example, if the current vehicle speed of the target vehicle is 100 km/h, the fourth preset distance may be 100 meters. If the current vehicle speed of the target vehicle is 60 km/h, the fourth preset distance may be 80 meters. A specific value of the fourth preset distance is not specifically limited in the present disclosure. Certainly, in another alternative embodiment, the safe lane changing condition may further be that the longitudinal distance between the target vehicle and the fourth vehicle on the second to-be-changed lane is greater than the fourth preset distance, that is, the longitudinal distance between the target vehicle and the fifth vehicle on the second to-be-changed lane is greater than a seventh preset distance, and the fourth preset distance is different from the seventh preset distance, but a minimum safe vehicle distance between vehicles needs to be met.

With reference to FIG. 2, as shown in FIG. 2, if the vehicle A is the first vehicle and the vehicle B3 is the target vehicle, the vehicle B3 is located in the rear area of the second boundary line in the traveling direction of the vehicle A on the lane 1, that is, the third area, and when a second lane changing instruction used for instructing the vehicle B3 to change a lane is obtained, it is determined whether the vehicle B3 meets the lane changing condition, that is, it is determined whether the longitudinal distance between the vehicle B3 and the vehicle B5 and whether the longitudinal distance between the vehicle B3 and the vehicle B6 are both greater than the fourth preset distance, and if both are greater than the fourth preset distance, prompt information notifying that the vehicle B3 is capable of being controlled to change to the lane 3 is displayed.

In some embodiments of the present disclosure, S303 may further include:
  determining, when the target area is the third area and an acceleration instruction used for instructing the target vehicle to accelerate is obtained, whether the target vehicle meets a safe acceleration condition, the safe acceleration condition being used for representing that after the target vehicle accelerates at a second acceleration for second duration, a distance between a vehicle before the target vehicle and the target vehicle is greater than 0;
  displaying, when the target vehicle meets the safe acceleration condition, prompt information notifying that the target vehicle is capable of being controlled to perform an acceleration operation; and
  displaying, when the target vehicle does not meet the safe acceleration condition, prompt information notifying that the target vehicle is incapable of being controlled to perform an acceleration operation.

In some embodiments of the present disclosure, it is determined, when the target vehicle meets the safe acceleration condition, whether the target vehicle travels out of the third area after the second duration; and
it is redetermined, when the target vehicle does not travel out of the third area, whether the target vehicle meets the safe acceleration condition.

In an implementation, it is prompted, when the target vehicle has traveled out of the third area after the target vehicle accelerates at a second acceleration for second duration, that the target vehicle is capable of being controlled to follow a vehicle ahead in a traveling lane of the target vehicle.

When an acceleration instruction used for instructing the target vehicle to accelerate is obtained, it is determined that the target vehicle has an acceleration intention. In the present disclosure, specific values of the second acceleration and the second duration are not specifically limited, provided that an average speed of the target vehicle does not exceed a maximum speed limit of a traveling road, and after the target vehicle accelerates at the second acceleration for the second duration, a distance between a vehicle before the target vehicle and the target vehicle is greater than 0.

In some embodiments of the present disclosure, S303 may further include:
  projecting, when the target area is the third area, the first vehicle to the lane in which the target vehicle is located, to obtain a first projected vehicle; and
  prompting that the target vehicle is capable of being controlled to follow the first projected vehicle, where that the target vehicle follows the first projected vehicle represents that a distance between the target vehicle and the first projected vehicle is greater than or equal to the fifth preset distance in the driving process.

The fifth preset distance may be a preset distance obtained according to experience, or may be a preset distance obtained according to a current speed of the target vehicle. For example, if the current vehicle speed of the target vehicle is 100 km/h, the fifth preset distance may be 100 meters. If the current vehicle speed of the target vehicle is 60 km/h, the fifth preset distance may be 80 meters, that is, the fifth preset distance is the minimum safe vehicle distance between the target vehicle and the first projected vehicle. A specific value of the fifth preset distance is not specifically limited in the present disclosure.

It is to be understood that in a process of following the first projected vehicle by the target vehicle, a maximum traveling speed of the target vehicle does not exceed a maximum speed limit of a traveling road section.

In some embodiments of the present disclosure, S301 may include:
  determining, based on the position of the first vehicle, a boundary line that passes through the first vehicle, which is parallel to a normal direction of the first lane, and that is at a first preset distance from a front contour line of the first vehicle, as a first boundary line; and
  determining a rear area of the first boundary line on the first lane in which the first vehicle is currently traveling as a fourth area in the multiple areas.

For a manner of determining the first boundary line, refer to the manner of determining the first boundary line in the first area. Details are not described herein again.

With reference to FIG. 2, as shown in FIG. 2, the rear area on the lane 2 and of the first boundary line in the traveling direction of the vehicle A is determined as the fourth area, that is, an area in which the vehicle B4 is located.

In some embodiments of the present disclosure, S303 may include:
  prompting, when the target area is the fourth area, that the target vehicle is capable of being controlled to follow the first vehicle, where that the target vehicle follows the first vehicle represents that a distance between the target vehicle and the first vehicle is greater than or equal to a sixth preset distance in the driving process.

The sixth preset distance may be a preset distance obtained according to experience, or may be a preset distance obtained according to a current speed of the target vehicle. For example, if the current vehicle speed of the target vehicle is 100 km/h, the sixth preset distance may be 100 meters. If the current vehicle speed of the target vehicle is 60 km/h, the sixth preset distance may be 80 meters, that is, the sixth preset distance is the minimum safe vehicle distance between the target vehicle and the first vehicle. A specific value of the sixth preset distance is not specifically limited in the present disclosure.

It is to be understood that in a process of following the first vehicle by the target vehicle, a maximum traveling speed of the target vehicle does not exceed a maximum speed limit of a traveling road section.

In one embodiment, The multiple target areas include at least two of the following areas: the first area, the second area, the third area, and the fourth area.

Figure 5:
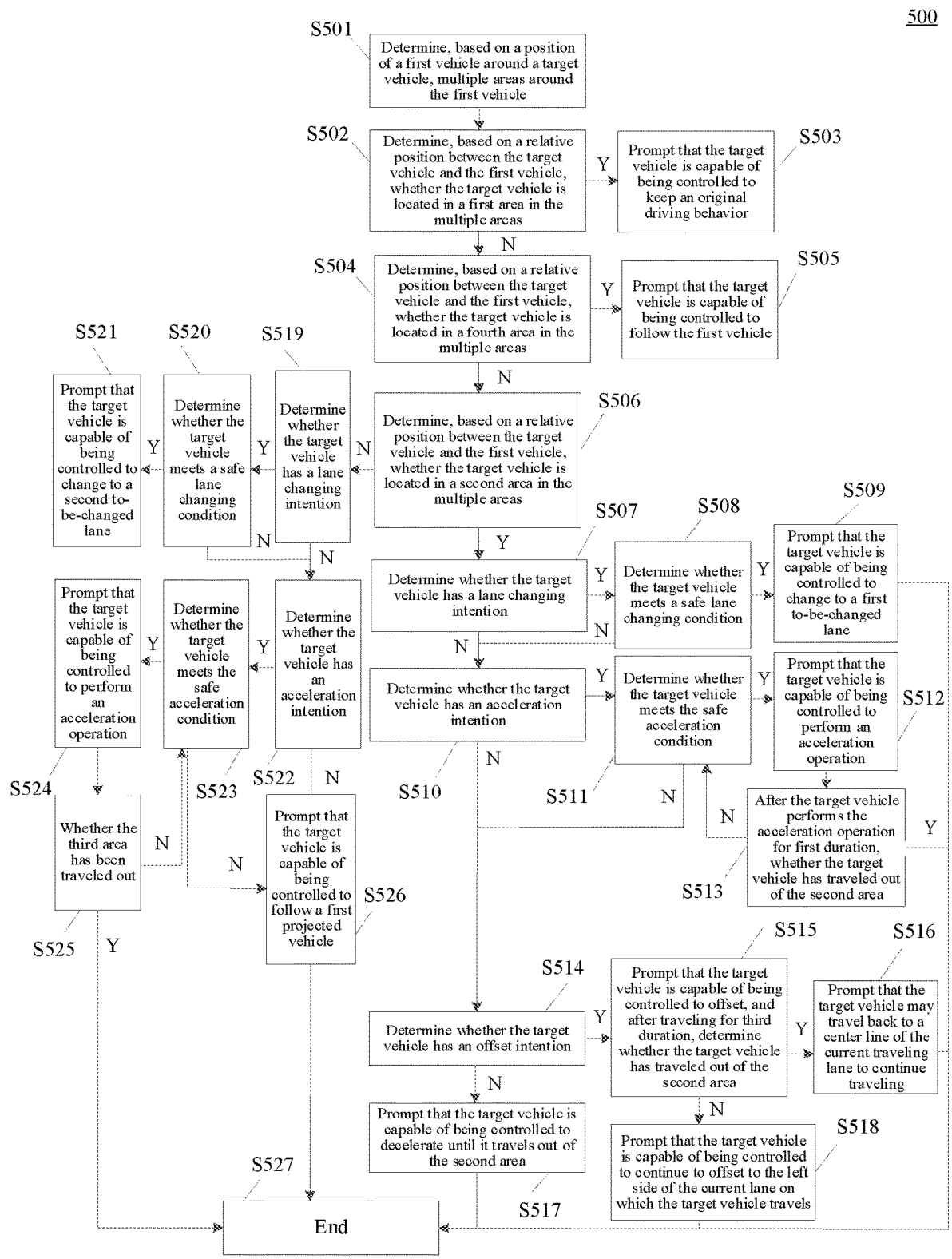
FIG. 5 is another schematic flowchart of a data processing method according to an embodiment of the present disclosure.

FIG. 5 is another schematic flowchart of a data processing method 500 according to an embodiment of the present disclosure.

As shown in FIG. 5, the method 500 may include some or all of the following content:

S501. Determine, based on a position of a first vehicle around a target vehicle, multiple areas around the first vehicle.

S502. Determine, based on a relative position between the target vehicle and the first vehicle, whether the target vehicle is located in a first area in the multiple areas.

S503. If the target vehicle is located in the first area, prompt that the target vehicle is capable of being controlled to keep an original driving behavior.

S504. If the target vehicle is not located in the first area, determine, based on a relative position between the target vehicle and the first vehicle, whether the target vehicle is located in a fourth area in the multiple areas.

S505. If the target vehicle is located in the fourth area, prompt that the target vehicle is capable of being controlled to follow the first vehicle.

S506. If the target vehicle is not located in the fourth area, determine, based on a relative position between the target vehicle and the first vehicle, whether the target vehicle is located in a second area in the multiple areas.

S507. If the target vehicle is located in the second area, determine whether the target vehicle has a lane changing intention.

S508. If the target vehicle has a lane changing intention in the second area, determine whether the target vehicle meets a safe lane changing condition.

S509. If the target vehicle meets the safe lane changing condition in the second area, prompt that the target vehicle is capable of being controlled to change to the first to-be-changed lane.

S510. When the target vehicle does not meet the safe lane changing condition or the target vehicle does not have a lane changing intention in the second area, determine whether the target vehicle has an acceleration intention.

S511. If the target vehicle has an acceleration intention in the second area, determine whether the target vehicle meets a safe acceleration condition.

S512. If the target vehicle meets the safe acceleration condition in the second area, prompt that the target vehicle is capable of being controlled to perform an acceleration operation.

S513. After the target vehicle performs the acceleration operation for first duration, whether the target vehicle has traveled out of the second area; if yes, the acceleration operation ends; or if no, return to perform S511: determine whether the target vehicle meets the safe acceleration condition.

S514. If the target vehicle does not meet the safe acceleration condition or the target vehicle does not have an acceleration intention in the second area, determine whether the target vehicle has an offset intention.

S515. If the target vehicle has an offset intention, prompt that the target vehicle is capable of being controlled to offset to a left side of a current lane in which the target vehicle is traveling, and after traveling for third duration, determine whether the target vehicle has traveled out of the second area.

S516. If the target vehicle has traveled out of the second area after traveling for the third duration, prompt that the target vehicle may travel back to a center line of the current traveling lane to continue traveling.

S517. If the target vehicle has no offset intention, prompt that the target vehicle is capable of being controlled to decelerate until it travels out of the second area.

S518. If the target vehicle does not travel out of the second area after traveling for the third duration, prompt that the target vehicle is capable of being controlled to continue to offset to the left side of the current lane in which the target vehicle travels.

S519. If the target vehicle is not located in the second area, the target vehicle is located in a third area, and determine whether the target vehicle has a lane changing intention in the third area.

S520. If the target vehicle has a lane changing intention in the third area, determine whether the target vehicle meets the safe lane changing condition.

S521. If the target vehicle meets the safe lane changing condition in the third area, prompt that the target vehicle is capable of being controlled to change to a second to-be-changed lane.

S522. When the target vehicle does not meet the safe lane changing condition or the target vehicle does not have a lane changing intention in the third area, determine whether the target vehicle has an acceleration intention.

S523. If the target vehicle has an acceleration intention in the third area, determine whether the target vehicle meets the safe acceleration condition.

S524. If the target vehicle meets the safe acceleration condition in the third area, prompt that the target vehicle is capable of being controlled to perform an acceleration operation.

S525. After the target vehicle performs the acceleration operation for second duration, whether the target vehicle has traveled out of the third area; if yes, the acceleration operation ends; or if no, return to perform S523: determine whether the target vehicle meets the safe acceleration condition.

S526. If the target vehicle does not meet the safe acceleration condition or the target vehicle does not have an acceleration intention in the third area, prompt that the target vehicle is capable of being controlled to follow a first projected vehicle, where the first projected vehicle is a vehicle obtained after the first vehicle is projected to the traveling lane of the target vehicle.

S527: End.

In the foregoing description, the related term "third\fourth\fifth\sixth" is merely for distinguishing between similar objects, and does not represent a specific sorting for the objects. It is to be understood that a specific sequence or order for "third\fourth\fifth\sixth" may be interchanged if allowed, which shall not be a limitation on the present disclosure.

The preferred implementations of the present disclosure are described in detail above with reference to the accompanying drawings. However, the present disclosure is not limited to the specific details in the foregoing implementations, multiple simple deformations may be made to the technical solution of the present disclosure within a range of the technical concept of the present disclosure, and these simple deformations fall within the protection scope of the present disclosure. For example, each specific technical feature described in the foregoing specific implementation may be combined in any suitable manners to form other/additional embodiments. To avoid unnecessary repetition, various suitable combination manners are not described otherwise in the present disclosure. For another example, any combination may also be performed between different implementations of the present disclosure, provided that the combination is not contrary to the idea of the present disclosure, the combination is to also be considered as the content disclosed in the present disclosure. It is to be further understood that in various embodiments of the present disclosure, an order of sequence numbers of the foregoing processes does not indicate an execution sequence, and execution sequences of the processes are to be determined according to functions and internal logics thereof and are not to impose any limitation on an implementation process of the embodiments of the present disclosure.

Figure 6:
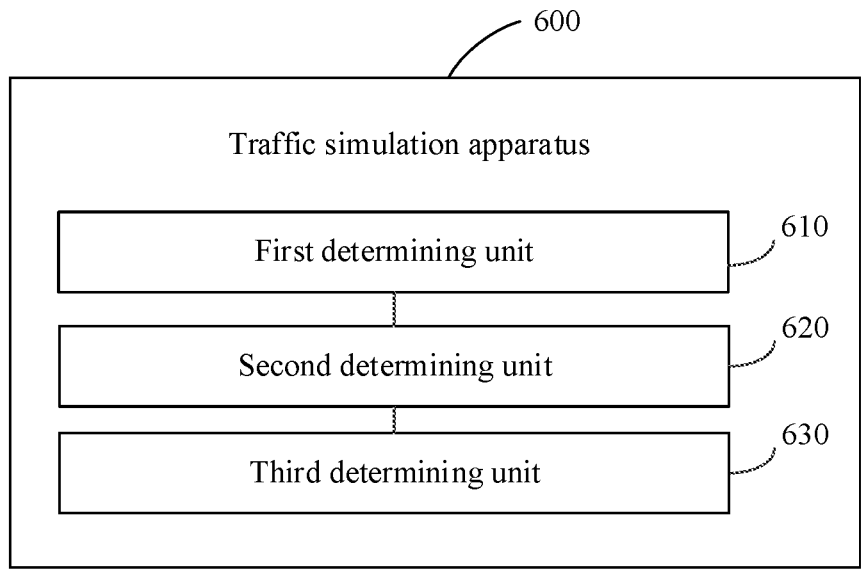
FIG. 6 is a schematic block diagram of a data processing apparatus according to an embodiment of the present disclosure.

The foregoing describes the method provided in the embodiments of the present disclosure, and the following describes a data processing apparatus provided in the embodiments of the present disclosure. FIG. 6 is a schematic block diagram of a data processing apparatus 600 according to an embodiment of the present disclosure.

As shown in FIG. 6, the data processing apparatus 600 may include some or all of the following content:

a first determining unit 610, configured to determine, based on a position of a first vehicle around a target vehicle, multiple areas around the first vehicle, a longitudinal center line of the first vehicle not coinciding with a center line of a first lane in which the first vehicle travels;

a second determining unit 620, configured to determine, based on a relative position between the target vehicle and the first vehicle, a target area in which the target vehicle is located in the multiple areas; and a third determining unit 630, configured to provide a corresponding prompt based on the target area.

In some embodiments of the present disclosure, the first determining unit 610 may be specifically configured to: determine, based on the position of the first vehicle, a boundary line that passes through the first vehicle, which is parallel to a normal direction of the first lane, and that is at a first preset distance from a front contour line of the first vehicle, as a first boundary line; and determine a front area that is located in a right adjacent lane of the first lane in which the first vehicle is currently traveling and that is of the first boundary line in a traveling direction of the first vehicle as a first area in the multiple areas.

In some embodiments of the present disclosure, the third determining unit 630 may be specifically configured to: display, when the target area is the first area, prompt information notifying that the target vehicle is capable of being controlled to keep an original driving behavior.

In some embodiments of the present disclosure, the first determining unit 610 may be further specifically configured to: determine, based on the position of the first vehicle, a boundary line that passes through the first vehicle, which is parallel to a normal direction of the first lane, and that is at a first preset distance from a front contour line of the first vehicle, as a first boundary line; determine, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and determine an area between the first boundary line and the second boundary line and located on a left adjacent lane in the traveling direction of the first vehicle as a second area in the multiple areas.

In some embodiments of the present disclosure, the third determining unit 630 may be further specifically configured to: determine, when the target area is the second area and a first lane changing instruction used for instructing the target vehicle to change a lane is obtained, whether the target vehicle meets a safe lane changing condition, the safe lane changing condition representing that both a longitudinal distance between the target vehicle and a second vehicle on a first to-be-changed lane and a longitudinal distance between the target vehicle and a third vehicle on the first to-be-changed lane are greater than a third preset distance, the second vehicle being a vehicle before the target vehicle in the traveling direction of the target vehicle, and the third vehicle being a vehicle after the target vehicle in the traveling direction of the target vehicle; display, when the target vehicle meets the safe lane changing condition, prompt information notifying that the target vehicle is capable of being controlled to change to the first to-be-changed lane; and display, when the target vehicle does not meet the safe lane changing condition, prompt information notifying that the target vehicle is incapable of being controlled to change to the first to-be-changed lane.

In some embodiments of the present disclosure, the third determining unit 630 may be further specifically configured to: determine, when the target area is the second area and an acceleration instruction used for instructing the target vehicle to accelerate is obtained, whether the target vehicle meets a safe acceleration condition, the safe acceleration condition representing that after the target vehicle accelerates at a first acceleration for first duration, a distance between a vehicle before the target vehicle and the target vehicle is greater than 0; display, when the target vehicle meets the safe acceleration condition, prompt information notifying that the target vehicle is capable of being controlled to perform an acceleration operation; and display, when the target vehicle does not meet the safe acceleration condition, prompt information notifying that the target vehicle is incapable of being controlled to perform an acceleration operation.

In some embodiments of the present disclosure, the third determining unit 630 may be further specifically configured to: determine, when the target vehicle meets the safe acceleration condition, whether the target vehicle is to travel out of the second area after traveling for the first duration; and redetermine, when the target vehicle does not travel out of the second area, whether the target vehicle meets the safe acceleration condition.

In one embodiment, the apparatus is further configured to: prompt, when the target vehicle has traveled out of the second area, that the target vehicle is capable of being controlled to follow a vehicle ahead in a traveling lane of the target vehicle.

In some embodiments of the present disclosure, the third determining unit 630 may be further specifically configured to: prompt, when the target area is the second area and an offset instruction used for instructing the target vehicle to perform left-side offset on the current lane is obtained, that the target vehicle is capable of being controlled to offset to the left side of the current lane in which the target vehicle is traveling, and continue to travel until travel out of the second area.

In some embodiments of the present disclosure, the first determining unit 610 may be further specifically configured to: determine, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and determine a rear area that is on a left adjacent lane of the first lane in which the first vehicle is currently traveling and that is of the second boundary line in the traveling direction of the first vehicle as a third area in the multiple areas.

In some embodiments of the present disclosure, the third determining unit 630 may be further specifically configured to: determine, when the target area is the third area and a second lane changing instruction used for instructing the target vehicle to change a lane is obtained, whether the target vehicle meets a safe lane changing condition, the safe lane changing condition representing that both a longitudinal distance between the target vehicle and a fourth vehicle on a second to-be-changed lane and a longitudinal distance between the target vehicle and a fifth vehicle on the second to-be-changed lane are greater than a fourth preset distance, the fourth vehicle being a vehicle before the target vehicle in the traveling direction of the target vehicle, and the fifth vehicle being a vehicle after the target vehicle in the traveling direction of the target vehicle; display, when the target vehicle meets the safe lane changing condition, prompt information notifying that the target vehicle is capable of being controlled to change to the second to-be-changed lane; and display, when the target vehicle does not meet the safe lane changing condition, prompt information notifying that the target vehicle is incapable of being controlled to change to the second to-be-changed lane.

In some embodiments of the present disclosure, the third determining unit 630 may be further specifically configured to: determine, when the target area is the third area and an acceleration instruction used for instructing the target vehicle to accelerate is obtained, whether the target vehicle meets a safe acceleration condition, the safe acceleration condition being used for representing that after the target vehicle accelerates at a second acceleration for second duration, a distance between a vehicle before the target vehicle and the target vehicle is greater than 0; display, when the target vehicle meets the safe acceleration condition, prompt information notifying that the target vehicle is capable of being controlled to perform an acceleration operation; and display, when the target vehicle does not meet the safe acceleration condition, prompt information notifying that the target vehicle is incapable of being controlled to perform an acceleration operation.

In some embodiments of the present disclosure, the third determining unit 630 may be further specifically configured to: determine, when the target vehicle meets the safe acceleration condition, whether the target vehicle travels out of the third area after the second duration; and redetermine, when the target vehicle does not travel out of the third area, whether the target vehicle meets the safe acceleration condition.

In some embodiments of the present disclosure, the third determining unit 630 may be further specifically configured to: project, when the target area is the third area, the first vehicle to the lane in which the target vehicle is located, to obtain a first projected vehicle; and prompt that the target vehicle is capable of being controlled to follow the first projected vehicle, where that the target vehicle follows the first projected vehicle represents that a distance between the target vehicle and the first projected vehicle is greater than or equal to the fifth preset distance in the driving process.

In one embodiment, the apparatus is further configured to: prompt, when the target vehicle has traveled out of the third area, that the target vehicle is capable of being controlled to follow a vehicle ahead in a traveling lane of the target vehicle.

In some embodiments of the present disclosure, the first determining unit 610 may be further specifically configured to: determine, based on the position of the first vehicle, a boundary line that passes through the first vehicle, which is parallel to a normal direction of the first lane, and that is at a first preset distance from a front contour line of the first vehicle, as a first boundary line; and determine a rear area of the first boundary line on the first lane in which the first vehicle is currently traveling as a fourth area in the multiple areas. In some embodiments of the present disclosure, the third determining unit 630 may be further specifically configured to: display, when the target area is the fourth area, prompt information notifying that the target vehicle is capable of being controlled to follow the first vehicle.

It is to be understood that the data processing apparatus embodiment and the method embodiment may correspond to each other. For similar description, references may be made to the method embodiment. To avoid repetition, details are not described herein again. Specifically, the data processing apparatus 600 may be corresponding to a corresponding body in the method 300 and the method 500 in the embodiments of the present disclosure, and each unit in the data processing apparatus 600 is separately used for implementing a corresponding procedure in the method 300 and the method 500. For brevity, details are not described herein again.

It is to be further understood that the units in the data processing apparatus 600 in this embodiment of the present disclosure may be selectively combined or all combined, into one or more other units, or one (or more) of the units herein may further be divided into multiple units of smaller functions. In this way, the same operations can be implemented, and implementation of the technical effects of the embodiments of the present disclosure is not affected. The foregoing units are divided based on logical functions. In an actual application, a function of one unit may be implemented by multiple units, or functions of multiple units are implemented by one unit. In another embodiment of the present disclosure, the data processing apparatus 600 may alternatively include other units. In actual application, these functions may be implemented with the assistance of other units, and may be cooperatively implemented by multiple units. According to another embodiment of the present disclosure, a computer program (including program code) that can execute steps involved in a corresponding method may be run on a general-purpose computing device that includes a processing element such as a central processing unit (CPU), a random access storage medium (RAM), a read-only storage medium (ROM), and a storage element, to construct the data processing apparatus 600 in the embodiment of the present disclosure and implement the data processing method in the embodiment of the present disclosure. The computer program may be recorded in, for example, a computer readable storage medium, and is installed in an electronic device by using the computer readable storage medium, for implementing a corresponding method in the embodiment of the present disclosure.

In other words, the foregoing units may be implemented in a hardware form, may be implemented in an instruction in a software form, or may be implemented in a combination of software and hardware. Specifically, the steps of the method embodiments in the present disclosure may be completed by using an integrated logic circuit of hardware in a processor and/or an instruction in a form of software. The steps of the method disclosed with reference to the embodiments of the present disclosure may be directly performed by a hardware decoding processor, or may be performed by using a combination of hardware and software in a decoding processor. In one embodiment, the software may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the method embodiments in combination with hardware thereof.

Figure 7:
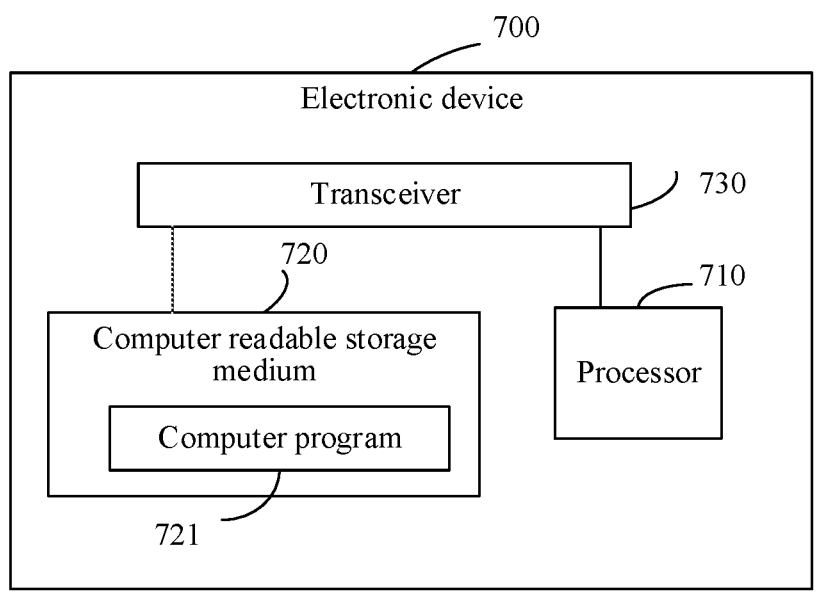
FIG. 7 is a schematic structural diagram of an electronic device according to an embodiment of the present disclosure.

FIG. 7 is a schematic structural diagram of an electronic device 700 according to an embodiment of the present disclosure.

As shown in FIG. 7, the electronic device 700 includes at least a processor 710 and a computer readable storage medium 720. The processor 710 and the computer readable storage medium 720 may be connected by using a bus or in another manner. The computer readable storage medium 720 is configured to store a computer program 721. The computer program 721 includes a computer instruction. The processor 710 is configured to execute the computer instruction stored in the computer readable storage medium 720. The processor 710 is a computing core and a control core of the electronic device 700, and is adapted to implement one or more computer instructions, and is specifically adapted to load and execute one or more computer instructions, for implementing a corresponding method procedure or a corresponding function.

As an example, the processor 710 may also be referred to as a central processing unit (CPU). The processor 710 may include but is not limited to: a general purpose processor, a digital signal processor (DSP), an application-specific integrated circuit (ASIC), a field programmable gate array (FPGA) or another programmable logic device, a discrete gate or a transistor logic device, a discrete hardware component, or the like.

As an example, the computer readable storage medium 720 herein may be a high-speed RAM memory, or may be a non-volatile memory, for example, at least one disk memory. In one embodiment, the computer readable storage medium may be at least one computer readable storage medium located far away from the foregoing processor 710. Specifically, the computer readable storage medium 720 includes but is not limited to: a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DRRAM), are available.

In an implementation, the electronic device 700 may be the data processing apparatus 600 shown in FIG. 6. The computer readable storage medium 720 stores a computer instruction. The processor 710 loads and executes the computer instruction stored in the computer readable storage medium 720, for implementing corresponding steps in the method embodiments shown in FIG. 3 and FIG. 5. In specific implementation, the computer instruction in the computer readable storage medium 720 is loaded by the processor 710 to perform a corresponding step. To avoid repetition, details are not described herein again.

According to another aspect of the present disclosure, an embodiment of the present disclosure further provides a computer readable storage medium (Memory), where the computer readable storage medium is a memory device in the electronic device 700, and is configured to store a program and data, for example, the computer readable storage medium 720. It may be understood that the computer readable storage medium 720 herein may include a built-in storage medium in the electronic device 700, and certainly may also include an extended storage medium supported by the electronic device 700. The computer readable storage medium provides storage space, and the storage space stores an operating system of the electronic device 700. In addition, one or more computer instructions suitable for being loaded and executed by the processor 710 are further stored in the storage space. These computer instructions may be one or more computer programs 721 (including program code).

The electronic device 700 may further include: a transceiver 730, where the transceiver 730 may be connected to the processor 710 or the computer readable storage medium 720.

The computer readable storage medium 720 may control the transceiver 730 to communicate with another device, specifically, may send information or data to another device, or receive information or data sent by another device. The transceiver 730 may include a transmitter and a receiver. The transceiver 730 may further include an antenna, and a quantity of antennas may be one or more.

According to another aspect of the present disclosure, a computer program product or a computer program is provided, the computer program product or the computer program including computer instructions, the computer instructions being stored in a computer readable storage medium, for example, the computer program 721. In this case, the electronic device 700 may be a computer. The processor 710 reads the computer instruction from the computer readable storage medium 720, and the processor 710 executes the computer instruction, so that the computer performs the data processing method provided in the foregoing optional manners.

In other words, when software is used for implementation, implementation may be entirely or partially performed in the form of a computer program product. The computer program product includes one or more computer instructions. When the computer program instruction is loaded and executed on the computer, a process of the embodiments of the present disclosure is completely or partially run or a function of the embodiments of the present disclosure is implemented. The computer may be a general-purpose computer, a special-purpose computer, a computer network, or another programmable apparatus. The computer instruction may be stored in a computer readable storage medium or transmitted from one computer readable storage medium to another computer readable storage medium. For example, the computer instruction may be transmitted from one website, computer, server or data center to another website, computer, server or data center in a wired (for example, a coaxial cable, an optical fiber or a digital subscriber line (DSL)) or wireless (for example, infrared, wireless or microwave) manner.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may notice that the exemplary units and flow steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. Those skilled in the art may use different methods to implement the described functions for each particular application, but such implementation is not to be considered beyond the scope of the present disclosure.

Finally, the foregoing embodiments are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
   determining, based on a position of a first vehicle around a target vehicle, multiple areas around the first vehicle, a longitudinal center line of the first vehicle not coinciding with a center line of a first lane in which the first vehicle travels, wherein the multiple areas include at least a first area, the first area comprises a front area that is located in a right adjacent lane of the first lane and that is in front of a first boundary line in a traveling direction of the first vehicle, the first boundary line passes through the first vehicle, is parallel to a normal direction of the first lane, and is at a first preset distance from a front contour line of the first vehicle;
   determining, based on a relative position between the target vehicle and the first vehicle, a target area, in the multiple areas, in which the target vehicle is located; and
   providing a prompt based on the target area, wherein in response to the target area being the first area, prompt information is displayed notifying that the target vehicle is capable of being controlled to keep an original driving behavior.

2. The method according to claim 1, wherein determining the multiple areas around the first vehicle comprises:
   determining, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and
   determining an area between the first boundary line and the second boundary line and located on a left adjacent lane in a traveling direction of the first vehicle as a second area in the multiple areas.

3. The method according to claim 2, wherein providing the prompt based on the target area comprises:
   determining, in response to the target area being the second area and a first lane changing instruction used for instructing the target vehicle to change a lane being obtained, whether the target vehicle meets a safe lane changing condition, the safe lane changing condition representing that both a longitudinal distance between the target vehicle and a second vehicle on a first to-be-changed lane and a longitudinal distance between the target vehicle and a third vehicle on the first to-be-changed lane are greater than a third preset distance, the second vehicle being a vehicle before the target vehicle in the traveling direction of the target vehicle, and the third vehicle being a vehicle after the target vehicle in the traveling direction of the target vehicle;
   displaying, in response to the target vehicle meeting the safe lane changing condition, prompt information notifying that the target vehicle is capable of being controlled to change to the first to-be-changed lane; and
   displaying, in response to the target vehicle not meeting the safe lane changing condition, prompt information notifying that the target vehicle is incapable of being controlled to change to the first to-be-changed lane.

4. The method according to claim 2, wherein providing the prompt based on the target area comprises:
   determining, in response to the target area being the second area and an acceleration instruction used for instructing the target vehicle to accelerate being obtained, whether the target vehicle meets a safe acceleration condition, the safe acceleration condition representing that after the target vehicle accelerates at a first acceleration for first duration, a distance between a vehicle before the target vehicle and the target vehicle is greater than 0;
   displaying, in response to the target vehicle meeting the safe acceleration condition, prompt information notifying that the target vehicle is capable of being controlled to perform an acceleration operation; and
   displaying, in response to the target vehicle not meeting the safe acceleration condition, prompt information notifying that the target vehicle is incapable of being controlled to perform an acceleration operation.

5. The method according to claim 4, further comprising:
   determining, in response to the target vehicle meeting the safe acceleration condition, whether the target vehicle is to travel out of the second area after traveling for the first duration; and
   redetermining, in response to the target vehicle not travelling out of the second area, whether the target vehicle meets the safe acceleration condition.

6. The method according to claim 5, further comprising:
   prompting, in response to the target vehicle having traveled out of the second area, that the target vehicle is capable of being controlled to follow a vehicle ahead in a traveling lane of the target vehicle.

7. The method according to claim 2, wherein providing the prompt based on the target area comprises:
   prompting, in response to the target area being the second area and an offset instruction used for instructing the target vehicle to perform left-side offset on the current lane being obtained, that the target vehicle is capable of being controlled to offset to the left side of the current lane in which the target vehicle is traveling, and continue to travel until travel out of the second area.

8. The method according to claim 1, wherein determining the multiple areas around the first vehicle comprises:
   determining, based on the position of the first vehicle, a boundary line that is located in a direction opposite to a traveling direction of the first vehicle, which is parallel to a normal direction of the first lane, and that is at a second preset distance from a front contour line of the first vehicle as a second boundary line; and
   determining a rear area that is on a left adjacent lane of the first lane in which the first vehicle is currently traveling and that is of the second boundary line in the traveling direction of the first vehicle as a second area in the multiple areas.

9. The method according to claim 8, wherein providing the prompt based on the target area comprises:
determining, in response to the target area being the second area and a first lane changing instruction used for instructing the target vehicle to change a lane being obtained, whether the target vehicle meets a safe lane changing condition, the safe lane changing condition representing that both a longitudinal distance between the target vehicle and a second vehicle on a first to-be-changed lane and a longitudinal distance between the target vehicle and a third vehicle on the first to-be-changed lane are greater than a third preset distance, the second vehicle being a vehicle before the target vehicle in the traveling direction of the target vehicle, and the third vehicle being a vehicle after the target vehicle in the traveling direction of the target vehicle;
displaying, in response to the target vehicle meeting the safe lane changing condition, prompt information notifying that the target vehicle is capable of being controlled to change to the first to-be-changed lane; and
displaying, in response to the target vehicle not meeting the safe lane changing condition, prompt information notifying that the target vehicle is incapable of being controlled to change to the first to-be-changed lane.

10. The method according to claim 8, wherein providing the prompt based on the target area comprises:
determining, in response to the target area being the second area and an acceleration instruction used for instructing the target vehicle to accelerate being obtained, whether the target vehicle meets a safe acceleration condition, the safe acceleration condition being used for representing that after the target vehicle accelerates at a first acceleration for first duration, a distance between a vehicle before the target vehicle and the target vehicle is greater than 0;
displaying, in response to the target vehicle meeting the safe acceleration condition, prompt information notifying that the target vehicle is capable of being controlled to perform an acceleration operation; and
displaying, in response to the target vehicle not meeting the safe acceleration condition, prompt information notifying that the target vehicle is incapable of being controlled to perform an acceleration operation.

11. The method according to claim 10, further comprising:
determining, in response to the target vehicle meeting the safe acceleration condition, whether the target vehicle travels out of the second area after the first duration; and
redetermining, in response to the target vehicle not travelling out of the second area, whether the target vehicle meets the safe acceleration condition.

12. The method according to claim 11, further comprising:
prompting, in response to the target vehicle having traveled out of the second area, that the target vehicle is capable of being controlled to follow a vehicle ahead in a traveling lane of the target vehicle.

13. The method according to claim 1, wherein determining the multiple areas around the first vehicle comprises:
determining a rear area of the first boundary line on the first lane in which the first vehicle is currently traveling as a second area in the multiple areas; and wherein providing the prompt based on the target area comprises:
displaying, in response to the target area being the second area, prompt information notifying that the target vehicle is capable of being controlled to follow the first vehicle.

14. An electronic device, comprising:
one or more processors;
a memory coupled to the one or more processors and storing a computer program that, when being executed, causes the one or more processors to perform:
determining, based on a position of a first vehicle around a target vehicle, multiple areas around the first vehicle, a longitudinal center line of the first vehicle not coinciding with a center line of a first lane in which the first vehicle travels, wherein the multiple areas include at least a first area, the first area comprises a front area that is located in a right adjacent lane of the first lane and that is in front of a first boundary line in a traveling direction of the first vehicle, the first boundary line passes through the first vehicle, is parallel to a normal direction of the first lane, and is at a first preset distance from a front contour line of the first vehicle;
determining, based on a relative position between the target vehicle and the first vehicle, a target area, in the multiple areas, in which the target vehicle is located; and
providing a prompt based on the target area, wherein in response to the target area being the first area, prompt information is displayed notifying that the target vehicle is capable of being controlled to keep an original driving behavior.

15. The electronic device according to claim 14, wherein the one or more processors are further configured to perform:
determining, based on the position of the first vehicle, a boundary line that is located in a direction opposite to the traveling direction of the first vehicle, which is parallel to the normal direction of the first lane, and that is at a second preset distance from the front contour line of the first vehicle as a second boundary line; and
determining an area between the first boundary line and the second boundary line and located on a left adjacent lane in a traveling direction of the first vehicle as a second area in the multiple areas.

16. The electronic device according to claim 15, wherein the one or more processors are further configured to perform:
determining, in response to the target area being the second area and a first lane changing instruction used for instructing the target vehicle to change a lane being obtained, whether the target vehicle meets a safe lane changing condition, the safe lane changing condition representing that both a longitudinal distance between the target vehicle and a second vehicle on a first to-be-changed lane and a longitudinal distance between the target vehicle and a third vehicle on the first to-be-changed lane are greater than a third preset distance, the second vehicle being a vehicle before the target vehicle in the traveling direction of the target vehicle, and the third vehicle being a vehicle after the target vehicle in the traveling direction of the target vehicle;
displaying, in response to the target vehicle meeting the safe lane changing condition, prompt information notifying that the target vehicle is capable of being controlled to change to the first to-be-changed lane; and displaying, in response to the target vehicle not meeting the safe lane changing condition, prompt information notifying that the target vehicle is incapable of being controlled to change to the first to-be-changed lane.

17. The electronic device according to claim 15, wherein the one or more processors are further configured to perform:
- determining, in response to the target area being the second area and an acceleration instruction used for instructing the target vehicle to accelerate being obtained, whether the target vehicle meets a safe acceleration condition, the safe acceleration condition representing that after the target vehicle accelerates at a first acceleration for first duration, a distance between a vehicle before the target vehicle and the target vehicle is greater than 0;
- displaying, in response to the target vehicle meeting the safe acceleration condition, prompt information notifying that the target vehicle is capable of being controlled to perform an acceleration operation; and
- displaying, in response to the target vehicle not meeting the safe acceleration condition, prompt information notifying that the target vehicle is incapable of being controlled to perform an acceleration operation.

18. A non-transitory computer readable storage medium, configured to store a computer program that causes a computer to perform:
- determining, based on a position of a first vehicle around a target vehicle, multiple areas around the first vehicle, a longitudinal center line of the first vehicle not coinciding with a center line of a first lane in which the first vehicle travels, wherein the multiple areas include at least a first area, the first area comprises a front area that is located in a right adjacent lane of the first lane and that is in front of a first boundary line in a traveling direction of the first vehicle, the first boundary line passes through the first vehicle, is parallel to a normal direction of the first lane, and is at a first preset distance from a front contour line of the first vehicle;
- determining, based on a relative position between the target vehicle and the first vehicle, a target area, in the multiple areas, in which the target vehicle is located; and
- providing a prompt based on the target area, wherein in response to the target area being the first area, prompt information is displayed notifying that the target vehicle is capable of being controlled to keep an original driving behavior.

* * * * *